Patented June 15, 1948

2,443,183

UNITED STATES PATENT OFFICE 2,443,183

PROCESS FOR CHLORINATION OF ETHANOL

Oliver W. Cass, Niagara Falls, N. Y., assignor to E. I. du Pont de Nemours & Company, Wilmington, Del., a corporation of Delaware No Drawing. Application November 30, 1944, Serial No. 566,015

6 Claims. (Cl. 260—601)

1

This invention relates to the manufacture of chlorinated products by the chlorination of ethanol and is more particularly directed to processes in which ethanol is added to products of a previous chlorination of ethanol and is then chlorinated.

The preparation of chloral and chloral hydrate by the chlorination of ethanol has previously been known but the processes heretofore employed have been slow, hazardous, and complicated. Such procedures as have been used before may have been acceptable for preparing small amounts of chloral and chloral hydrate but they are not suitable for the commercial manufacture of these products in large volume.

The commercial processes previously available begin by chlorinating absolute alcohol with a stream of chlorine at a very low temperature. There is a danger that the mixture of alcohol vapor and chlorine may explode. To minimize the hazard the art has used as low a temperature as possible and has operated the process very slowly in the dangerous initial stages.

It is an object of the present invention to provide processes for the chlorination of ethanol which reduce the explosion hazard and which may be operated at relatively higher temperatures and in a relatively shorter time than previously known processes. It is a further object to provide continuous processes for the chlorination of ethanol well adapted to large scale production of chloral and chloral hydrate. Still further objects will become apparent hereinafter.

The foregoing and other objects of the invention are attained by adding ethanol to products of a previous chlorination of ethanol and then chlorinating the mixture. Chlorine is thus not run into pure ethanol, but rather it is run into a mixture of ethanol with chloral alcoholate and other products of the chlorination of ethanol.

By adding ethanol to products of a previous chlorination, the explosion hazard is minimized and one is able to start the reaction at a higher temperature than if one begins the chlorination of pure ethanol. The total time required is, therefore, reduced and the heat transfer is improved by the presence of the relatively inactive chlorinated products of ethanol.

A process of the invention may be carried out in a semi-continuous manner as by adding ethanol to a heel of the product obtained in a previous chlorination reaction. In accordance with this procedure, about 20% by volume of the charge of a previous chlorination is allowed to remain in the reaction vessel and alcohol equivalent in a volume to the portion of charge removed is then added.

The chlorination can then be initiated at a temperature of 50–60° C., though, of course, a lower temperature may be used if it is for any reason desired to do so.

After partial chlorination a point is reached where HCl is evolved and as soon as this point is reached the temperature can be raised still further to, say 70–90° C. The chlorination can then be completed at the more elevated temperatures.

Instead of starting the reaction at a relatively low temperature, one may instead begin at a temperature near the boiling point of the batch, say about 80° C. As the chlorination proceeds the boiling point rises and progressively higher temperatures can be used. If the process is operated in this manner with temperatures near the boiling point, an adequate reflux system or its equivalent must be provided to return vapors and entrained liquid from the off-gases to the batch.

After the charge has been chlorinated to the desired extent, about 80% of the product is removed and the procedure is repeated.

The amount of heel to employ in each charge can be varied since it is important only that enough be used to reduce the vapor pressure to a desired extent and to give the advantages incident to better heat transfer. In general it will be found that the advantages are proportional to the amount of heel used and while it will usually be desired to employ about 20% by volume of the products of chlorination, some measure of advantage will be gained by the use of 15% or 10% or even less. More can of course be used though when more than about 20% by volume is used it is questionable whether the advantages obtained for such larger amounts warrant the larger equipment required for effecting the reactions.

When the process is operated at low temperatures, the first or low-temperature phase of the reaction of the present invention is preferably operated as above indicated at a temperature not substantially higher than about 60° C. and is continued to such a degree of chlorination as results in a specific gravity of 1.15 at 20° C. This gravity represents the point at which more rapid evolution of HCl begins.

The second phase of the reaction is conducted at a considerably higher temperature, say below about 90° C., and the reaction mixture is slowly brought to the higher temperature. Chlorination is continued to the desired extent, say 1.3 at 20° C. A specific gravity of 1.44 at 20° C. has been found very successful in commercial use and even higher specific gravities may be reached, say from 1.50 to 1.52. A specific gravity as high as 1.58 has been reached by continuing the chlorination but the reaction slows down as the higher degrees of chlorination are reached, and it is ordinarily preferable to employ the practice hereafter described in more detail of chlorinating to a lower extent and then returning the underchlorinated materials as products of chlorination in the first phase of the chlorination reaction according to the present invention.

If the process is operated at high temperatures near the boiling point of the batch the same general considerations as to degree of chlorination are applicable.

Processes of the present invention in which ethanol is added to products of a previous chlorination of ethanol may be conducted in a manner which is truly continuous. In order to accomplish this, it is desirable to provide two or more reaction vessels.

The first reaction vessel will in operation contain products of chlorination of ethanol representing about 80% of the theoretical quantity of chlorine. This reaction vessel will correspond to the first phase of the semi-continuous process above described and substantially the same consideration will be applicable to the point at which the chlorinated product is removed from the vessel for the second phase of the chlorination. In other words, the chlorinated product will ordinarily have a specific gravity near about 1.3.

Ethanol should be continuously supplied to the reaction vessel, and, of course, chlorine is also supplied continuously. This displaces some of the reaction product which spills out of the first reaction vessel through a liquid seal into the second reaction vessel.

In a second reaction vessel the additional quantity of chlorine required to effect the desired degree of chlorination is introduced. The extent of chlorination and the temperature of operation of this second reaction vessel will be determined by considerations similar to those given above in discussing the second phase of the semi-continuous process.

If high temperatures are used throughout the reaction, the points of division of the process into stages can be arbitrary.

It will be apparent that by operating in accordance with this continuous procedure there is no introduction of chlorine into alcohol because the first reaction vessel always contains a relatively large proportion of the chlorinated product. Moreover, this process because of its continuous character is readily adapted for large scale operation. The reaction vessels may be conveniently equipped with automatic control so that the process can be operated with a minimum of supervision.

While the continuous process has been specifically described with reference to the use of two reaction vessels, it will be understood that three, four, or even more may be used, each overflowing into the next.

Processes of this invention may advantageously be effected in the presence of light as an activation catalyst. This permits decreasing the time necessary for the chlorination. Ultraviolet light is unnecessary although it can, of course, be utilized. I have found light from the ordinary tungsten filament incandescent bulb entirely satisfactory and the so-called "daylight" fluorescent lamps give very satisfactory results. It will be understood that the use of light is claimed in my copending application, S. N. 527,012, filed March 17, 1944, and that this feature as such constitutes no part of the present invention.

Absolute alcohol which has been used in the past may be used in processes of this invention, but the ordinary 95% alcohol of commerce may also be used. Even more water may be present and there may be used an alcohol containing 80% or even 70% of water. The water appears to have little effect other than that which would be expected from the dilution of the reaction batch.

The product obtained by the chlorination of ethanol by processes of the invention can be converted to chloral by distillation with sulfuric acid. The crude chloral thus obtained may be fractionated and the low-boiling, underchlorinated materials may be separated from the chloral.

The low-boiling material, largely dichloroacetaldehyde, may be returned to the first chlorination step as one of the reaction products of ethanol to which ethanol is added according to the present invention. In addition to the advantages already pointed out, the return of low-boiling materials according to this aspect of the invention has the further advantage that the presence of the low-boiling material tends to reduce and to minimize the formation of high-boiling material in the chlorination reaction. As has been suggested above, it will usually be found desirable to carry the chlorination only to a specific gravity of about 1.50 to 1.52 and then return the underchlorinated material. It may even be found desirable to carry the chlorination to a point somewhat short of those preferred specific gravities and return an even larger proportion of underchlorinated material.

In order to prevent spontaneous polymerization of the chloral during processing and storage, it is desirable to introduce, in small amounts, hydroquinone or some other antioxidant.

The invention may be better understood by reference to the following illustrative examples.

*Example I*

A five-gallon, glass-lined, jacketed vessel was fitted with a light well made of Pyrex hard glass tube, a reflex condenser, a well for a thermometer, a stirrer, a cooling coil, and an inlet tube for chlorine gas.

A charge was prepared consisting of 7.5 pounds of the reaction product from a preceding batch and 15.8 pounds of alcohol of the special denaturated formula "2B" containing 14.5 pounds of absolute ethanol. The charge was introduced into the reaction vessel and a tungsten filament light bulb of 250 watts was inserted in the light well and turned on. Cooling brine was permitted to flow thru the cooling coil to maintain a temperature between about 50 and 55° C. while a stream of chlorine was run thru the mixture.

Chlorination was continued at about 50° C. for about five hours until a specific gravity of 1.15 at 20° C. was reached.

The temperature was then slowly raised to 80° C., eleven hours being taken to reach this temperature. The specific gravity at the end of this period was about 1.44.

The temperature was then held at 80° C. and the chlorination and agitation were continued for six more hours until a specific gravity of about 1.52 was reached. During the last two periods, HCl gas was given off.

The product of the chlorination, 30.3 lbs., was mixed with sulfuric acid and distilled to a pot temperature of 135° C. There was obtained a total of 22.2 lbs. of crude chloral. The crude chloral was fractionated and there was secured 16.65 lbs. of refined chloral. There was obtained also 2 lbs. of underchlorinated low-boiling material which, in accordance with one aspect of the invention, is used as a part of the initial charge.

A similar process of the invention is operated by using substantially the same reaction conditions and the same charge but without the use of light irradiation. Such a process is somewhat slower and it is desirable to operate it throughout at a temperature near the boiling point of the batch.

*Example II*

This example illustrates continuous chlorination. Two glass vessels were used. The first vessel was equipped with a stirrer, a light well, a reflux condenser, inlet lines for chlorine and alcohol, a well for a thermometer, and an overflow line with a U-bend in it which served as a liquid seal. The overflow line was positioned to maintain the vessel about two-thirds full.

The second vessel was connected to the overflow line from the first vessel. It was provided with a stirrer, a light well, a well for a thermometer, a reflux condenser, an inlet tube for chlorine, and an overflow line leading to a vented receiver. This overflow line also maintained this vessel two-thirds full. The reflux condensers were connected to suitable scrubbing systems for absorption of HCl.

The first vessel was charged with 400 grams of 95 per cent ethanol and was chlorinated, as in Example 1, until approximately 900 grams of chlorine had been added. At this point the product began to spill into the second vessel through the overflow line. The temperature in the first vessel was maintained at 50–60° C., and 95 per cent ethanol was now introduced with the chlorine at a rate corresponding to 0.5 cubic centimeter of ethanol and 1.0 gram of chlorine per minute.

As the second vessel filled with the product, it was heated to a temperature of 80–90° C., the light was turned on, agitation begun, and chlorine fed at the rate of about 0.8 gram per minute. The product soon began to spill out through the overflow line into the vented receiver.

When the system had attained a constant rate of production, the density of the contents of the first vessel was 1.36 (20°/4°), and the density of the product in the second vessel was 1.504 (20°/4°). By feeding the reactants at the indicated rates, the rate of production was approximately 0.6 gram per minute of crude chlorinated product.

From a total of 115 grams of 95 per cent ethanol and 298 grams of chlorine actually absorbed by the system in slightly less than six hours, a total of 208 grams of product was recovered. By treating the product as in the preceding examples with approximately equal weight of concentrated sulfuric acid, crude chloral in the amount of 148 grams was secured. From this there was secured, by fractionation, 115 grams of refined chloral. This is a yield of 100 lbs. for each 100 lbs. of 95 per cent ethanol and each 260 lbs. of chlorine used.

Underchlorinated material from the distillation of crude chloral is returned to the first reaction vessel as a part of the chlorination product of ethanol into which ethanol is added according to the present invention.

The continuous procedure here employed may similarly be operated without using light irradiation, tho the time required will be longer.

*Example III*

A continuous process like that of Example 2 was operated using four stages. Each of the reactors was provided with an agitator, a reflux condenser, a light well, a thermometer well, a gas inlet with a means for distributing gas, a liquid inlet terminating below the liquid level in the reactor, and an overflow designed to maintain the reactors about half full.

The reactors were set at different levels to allow for gravity flow from one to another. Fresh alcohol was fed to the first and highest reactor, and by displacement caused a proportionate overflow from one reactor to another until the final chlorinated product was withdrawn from the lowest reactor.

The product obtained by chlorination was distilled with sulfuric acid to produce crude chloral. The crude chloral was fractionated and the low boiling fraction was recycled to the first reactor.

While certain illustrative processes have been shown, it will be understood that without departing from the spirit of the invention one skilled in the art may readily devise numerous processes for the chlorination of ethanol involving adding ethanol to products of a previous chlorination of ethanol and then chlorinating the mixture.

This application is a continuation-in-part of my co-pending case, Serial No. 527,012, filed March 17, 1944.

I claim:

1. In a process for the chlorination of ethanol the step comprising adding ethanol to chloral alcoholate and other products of chlorination of ethanol and chlorinating.

2. In a process for the chlorination of ethanol the steps comprising adding ethanol to chloral alcoholate and other products of chlorination of ethanol and chlorinating and returning part of the product to a subsequent chlorination of ethanol.

3. In a process for the chlorination of ethanol the steps comprising adding ethanol to chloral alcoholate and other products of chlorination of ethanol and then chlorinating at a temperature near the boiling point.

4. In a continuous process for the chlorination of ethanol the steps comprising continuously feeding ethanol into a reactor which contains chloral alcoholate and other products of the chlorination of ethanol, reacting with chlorine to effect partial chlorination, continuously withdrawing some of the product, and continuously effecting chlorination of the withdrawn product.

5. In a process for the chlorination of ethanol the steps comprising adding ethanol to chloral alcoholate and other products of chlorination of ethanol, chlorinating the mixture, separating the product from underchlorinated material, and returning the underchlorinated material to the said ethanol addition step as a said chlorination product of ethanol.

6. In a process for the chlorination of ethanol the step comprising effecting the chlorination in the presence of an underchlorinated product of the chlorination of ethanol resulting from the fractional distillation of crude chloral produced by such a chlorination followed by treatment with sulfuric acid.

OLIVER W. CASS.

REFERENCES CITED

The following references are of record in the file of this patent:

UNITED STATES PATENTS

| Number | Name | Date |
|---|---|---|
| 774,151 | Besson | Nov. 8, 1904 |
| 985,528 | Hoefer et al. | Feb. 28, 1911 |
| 2,249,922 | Vaughan et al. | July 22, 1941 |
| 2,318,323 | Mueller-Cunradi et al. | May 4, 1943 |